(12) United States Patent
Hamano

(10) Patent No.: US 9,197,808 B2
(45) Date of Patent: Nov. 24, 2015

(54) IMAGE CAPTURING APPARATUS, METHOD OF CONTROLLING THE SAME, AND STORAGE MEDIUM

(71) Applicant: CANON KABUSHIKI KAISHA, Tokyo (JP)

(72) Inventor: Hideyuki Hamano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/208,231

(22) Filed: Mar. 13, 2014

(65) Prior Publication Data

US 2014/0293119 A1    Oct. 2, 2014

(30) Foreign Application Priority Data

Mar. 27, 2013   (JP) ................................. 2013-067128
Oct. 16, 2013   (JP) ................................. 2013-215821

(51) Int. Cl.
*H04N 5/232*    (2006.01)

(52) U.S. Cl.
CPC .................................. *H04N 5/23212* (2013.01)

(58) Field of Classification Search
CPC .......................... H04N 5/3696; H04N 5/23212
USPC ........................................................ 348/350
See application file for complete search history.

(56) References Cited

U.S. PATENT DOCUMENTS

| 2011/0317042 A1* | 12/2011 | Goto .............................. 348/241 |
| 2013/0107067 A1* | 5/2013 | Miyakoshi ................. 348/208.5 |
| 2013/0194471 A1* | 8/2013 | Yamashita ..................... 348/308 |
| 2014/0198239 A1* | 7/2014 | Suzuki et al. ................. 348/246 |
| 2014/0218592 A1* | 8/2014 | Fujii ............................. 348/345 |

FOREIGN PATENT DOCUMENTS

| JP | 2004-134867 A | 4/2004 |
| JP | 2008-052009 A | 3/2008 |
| JP | 2011-100077 A | 5/2011 |

* cited by examiner

*Primary Examiner* — James Hannett
(74) *Attorney, Agent, or Firm* — Cowan, Liebowitz & Latman, P.C.

(57) ABSTRACT

An image capturing apparatus comprises an image pickup device, a focus detection sensor including a first pixel group in which pixels configured to receive light beams passing through a partial area of a pupil of an imaging optical system are arranged and a second pixel group in which pixels configured to receive light beams passing through another partial area are arranged, and a correlation calculation unit configured to perform correlation calculation by using signals from pixels of the first pixel group and signals from pixels of the second pixel group, wherein the correlation calculation unit samples pixels, of the first pixel group, which have a positional shift amount of an integer multiple of a value obtained by dividing the predetermined interval, and performs correlation calculation by using signals from the sampled pixels of the second pixel group.

15 Claims, 11 Drawing Sheets

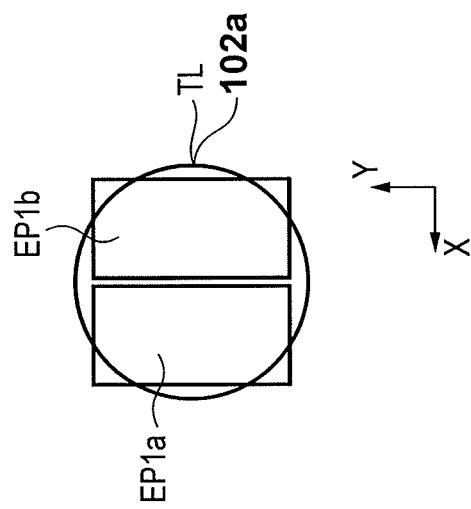
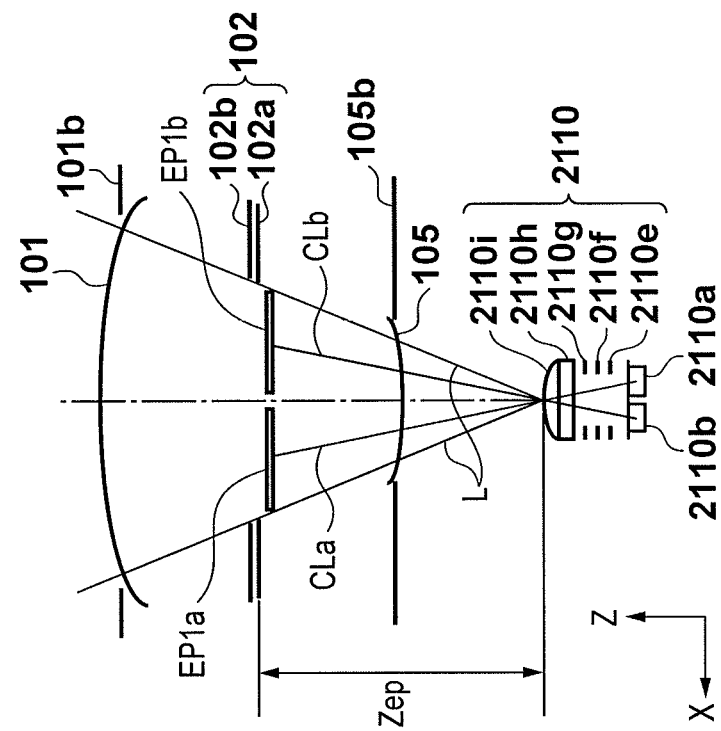

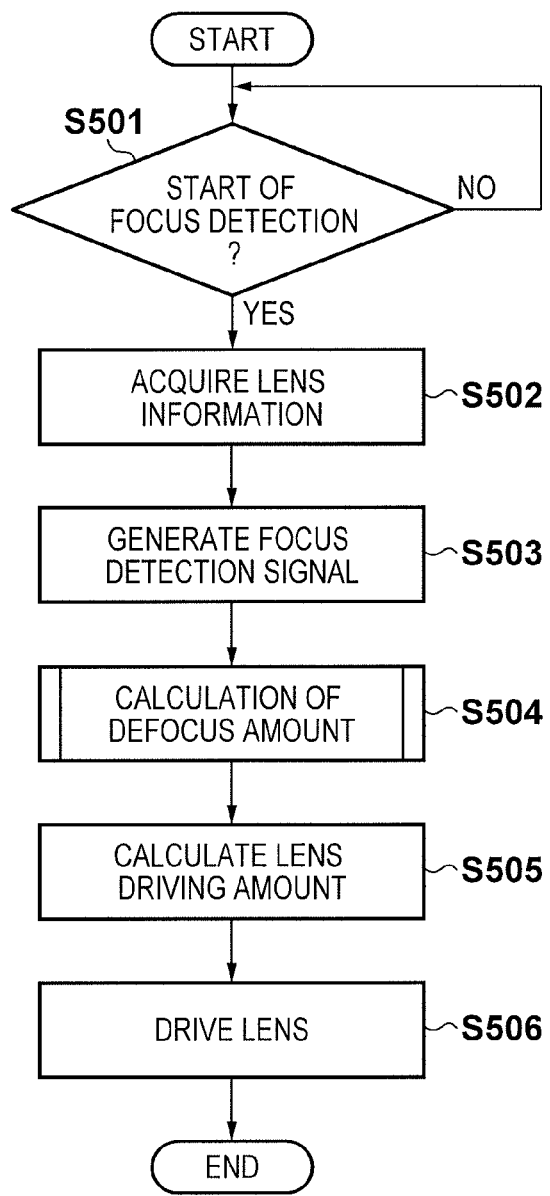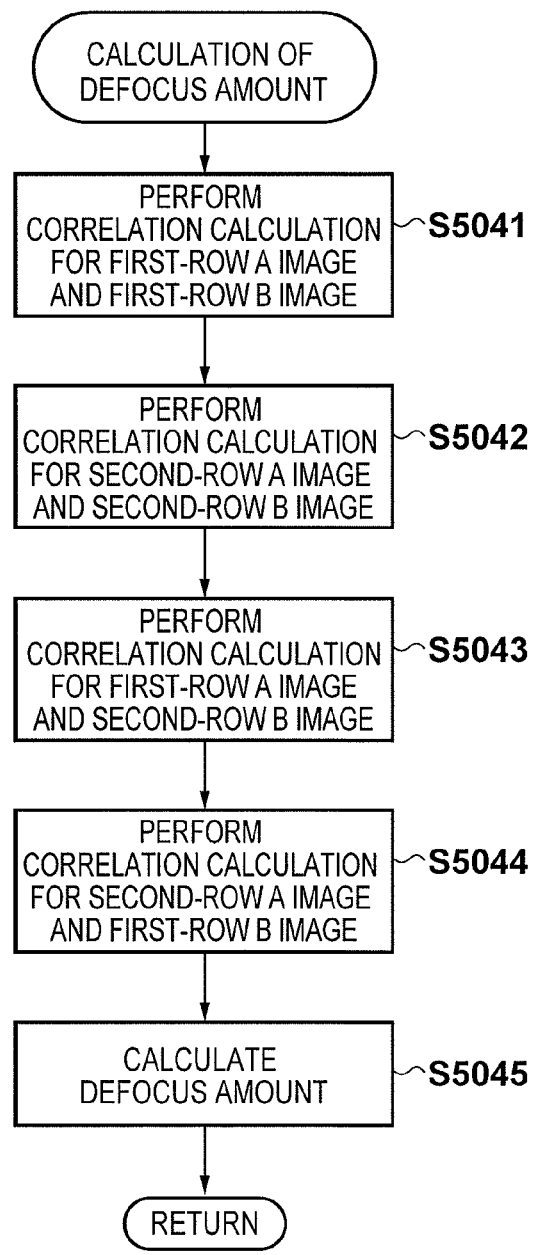

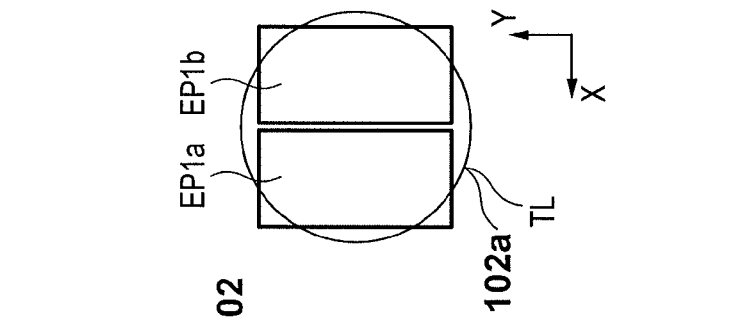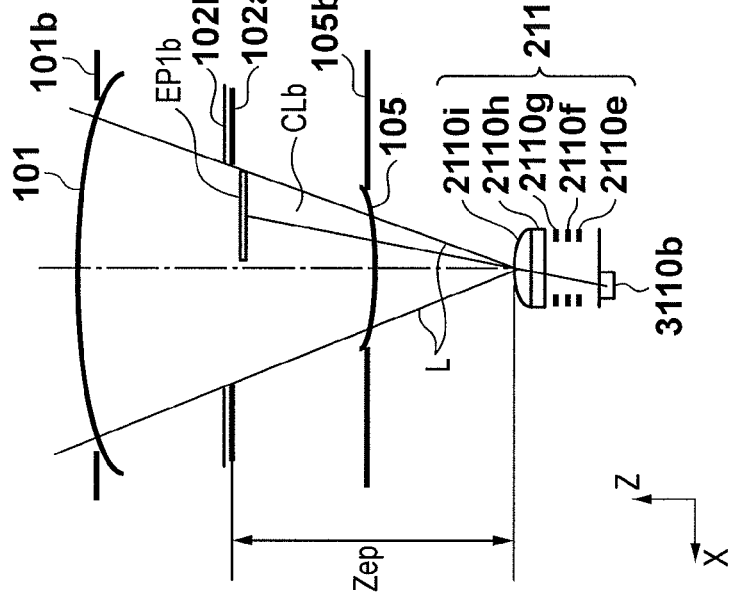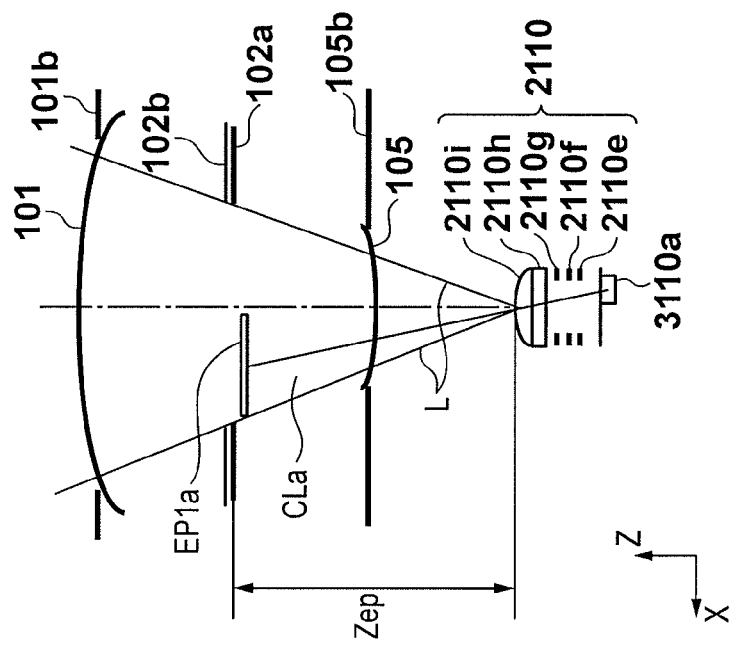

IMAGE CAPTURING APPARATUS, METHOD OF CONTROLLING THE SAME, AND STORAGE MEDIUM

BACKGROUND OF THE INVENTION

1. Field of the Invention

The present invention relates to an image capturing apparatus such as a digital camera or video camera.

2. Description of the Related Art

Japanese Patent Laid-Open No. 2008-52009 discloses an apparatus which performs focus detection using the pupil division scheme using a two-dimensional image pickup device having microlenses formed on the respective pixels as one of the schemes of detecting the focus state of an imaging lens. In this apparatus, the photo-electric conversion unit of each pixel constituting an image pickup device is divided into a plurality of units, and the divided photo-electric conversion units receive light beams passing through different areas of the pupil of the imaging lens through the microlens. This apparatus performs correlation calculation for calculating a phase difference as a shift amount for a pair of output signals from the photo-electric conversion units which have received light beams passing through different areas of the pupil of the imaging lens, and can calculate a defocus amount from the phase difference.

When performing the above correlation calculation, the apparatus preferably can calculate phase differences in units finer than the pixel pitch of an output signal, or in other words, subpixels, with high accuracy, in order to accurately calculate phase differences. When performing correlation calculation using a pair of output signals, the scheme disclosed in Japanese Patent Laid-Open No. 2008-52009 also performs interpolation calculation for the minimal value of a correlation amount by using a three-point interpolation technique to calculate a phase difference.

Depending on the phase difference between a pair of output signals, however, the technique disclosed in Japanese Patent Laid-Open No. 2008-52009 sometimes lets the interpolation calculation result on the minimal value be greatly influenced by an error. It is possible to reduce the error contained in the phase difference calculated from the first and second signals by using the phase difference calculated by using the second signal and the third signal different in sampling position from the first signal on an object image by half a pixel. However, the focus detection apparatus described in Japanese Patent Laid-Open No. 2008-52009 has not disclosed any method of implementing this technique.

SUMMARY OF THE INVENTION

The present invention has been made in consideration of the above problem and provides an image capturing apparatus including a focus adjustment apparatus capable of performing accurate phase difference detection with a small error.

According to the first aspect of the present invention, an image capturing apparatus comprises: an image pickup device configured to photo-electrically convert an object image; a focus detection sensor including a first pixel group in which pixels configured to receive light beams passing through a partial area of a pupil of an imaging optical system which forms an object image are arranged on a predetermined number of rows in a vertical direction and a second pixel group in which pixels configured to receive light beams passing through another partial area different from the partial area are arranged; and a correlation calculation unit configured to perform correlation calculation by using signals from pixels of the first pixel group which are sampled at predetermined intervals in a horizontal direction and signals from pixels of the second pixel group, wherein the correlation calculation unit samples pixels, of the first pixel group, which have a positional shift amount of an integer multiple of a value obtained by dividing the predetermined interval by the predetermined number of rows on a light-receiving surface of the focus detection sensor, and performs correlation calculation by using signals from the sampled pixels and signals from the pixels of the second pixel group.

According to the second aspect of the present invention, a method of controlling an image capturing apparatus including an image pickup device configured to photo-electrically convert an object image, and a focus detection sensor including a first pixel group in which pixels configured to receive light beams passing through a partial area of a pupil of an imaging optical system which forms an object image are arranged on a predetermined number of rows in a vertical direction and a second pixel group in which pixels configured to receive light beams passing through another partial area different from the partial area are arranged, comprises a correlation calculation step of performing correlation calculation by using signals from pixels of the first pixel group which are sampled at predetermined intervals in a horizontal direction and signals from pixels of the second pixel group, wherein in the correlation calculation step, pixels, of the first pixel group, which have a positional shift amount of an integer multiple of a value obtained by dividing the predetermined interval by the predetermined number of rows on a light-receiving surface of the focus detection sensor are sampled, and correlation calculation is performed by using signals from the sampled pixels and signals from the pixels of the second pixel group.

Further features of the present invention will become apparent from the following description of exemplary embodiments with reference to the attached drawings.

BRIEF DESCRIPTION OF THE DRAWINGS

FIG. 4A is a view for explaining the conjugate relationship between photo-electric conversion units of the image pickup device which are located near the middle of an image plane;

FIG. 4B is a view showing one pixel of the image pickup device;

FIG. 7 is a flowchart showing focus adjusting operation;

FIG. 8 is a flowchart showing a calculation subroutine for a defocus amount;

FIG. 13A is a view for explaining the conjugate relationship between the exit pupil plane of an imaging optical system and the photo-electric conversion units of the image pickup device which are arranged near the middle of an image plane in an image capturing apparatus according to the second embodiment;

FIG. 13B is a view for explaining the conjugate relationship between the exit pupil plane of an imaging optical system and the photo-electric conversion units of the image pickup device which are arranged near the middle of an imaging plane in the image capturing apparatus according to the second embodiment;

FIG. 13C is a view for explaining the conjugate relationship between the exit pupil plane of an imaging optical system and the photo-electric conversion units of the image pickup device which are arranged near the middle of an imaging plane in the image capturing apparatus according to the second embodiment.

DESCRIPTION OF THE EMBODIMENTS

The embodiments of the present invention will be described in detail below with reference to the accompanying drawings.

First Embodiment

Figure 1:
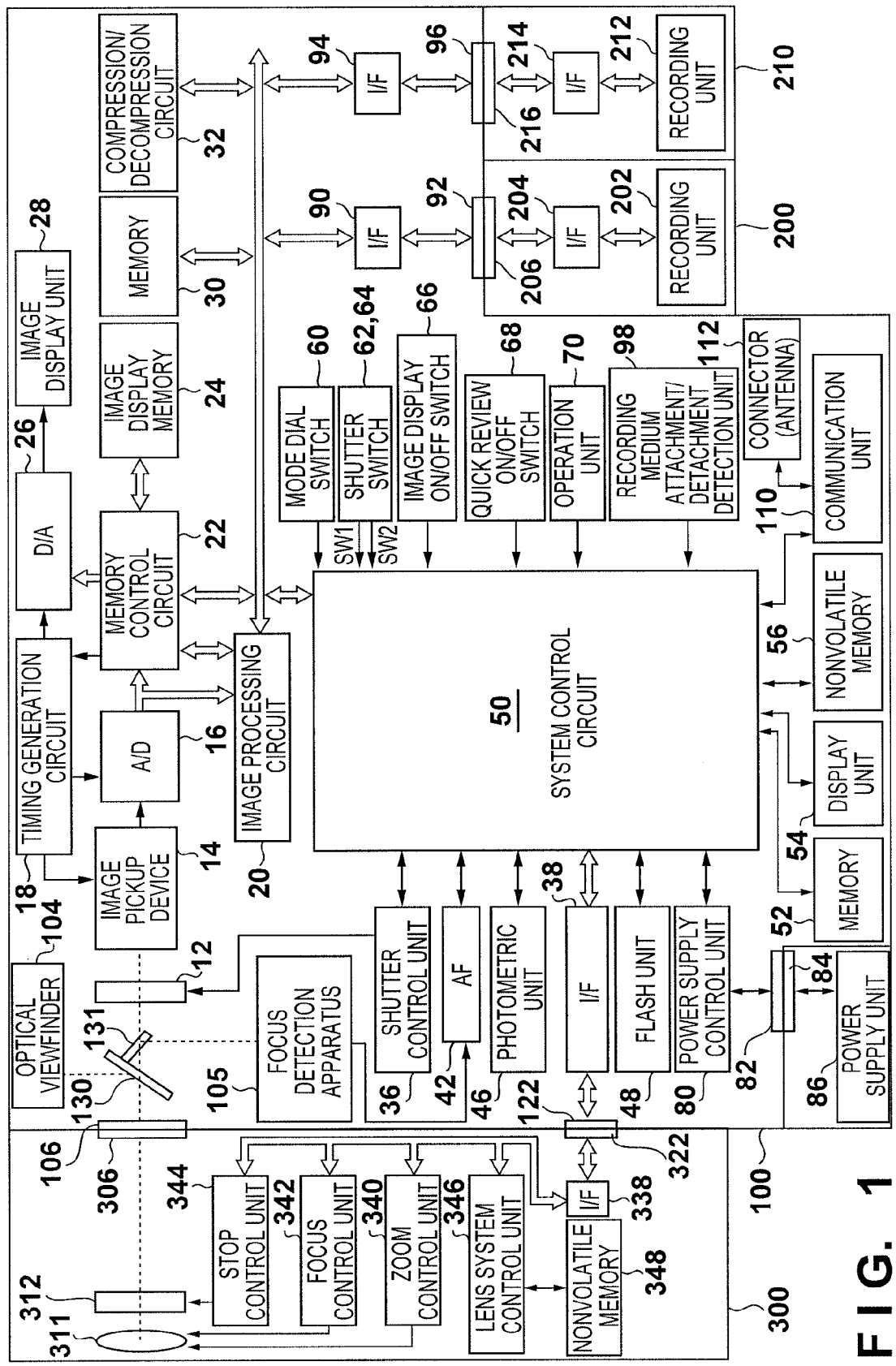
FIG. 1 is a block diagram showing the arrangement of an image capturing apparatus including a focus adjustment apparatus.

FIG. 1 is a block diagram showing the arrangement of an image capturing apparatus which is a camera system including a camera capable of interchanging a plurality of imaging lenses and the imaging lenses and includes a focus adjustment apparatus. Referring to FIG. 1, the camera system including the focus adjustment apparatus according to this embodiment includes a camera 100 and imaging lenses 300 interchangeably mounted in the camera. The arrangement of the camera 100 will be described first.

The camera 100 corresponds to a camera system including a plurality of types of imaging lenses 300, in which lenses of the same type with different serial numbers can be mounted. In addition, this camera system has an arrangement which allows mounting of the imaging lenses 300 with different focal lengths or minimum f-numbers or the imaging lens 300 having a zoom function and is capable of interchanging imaging lenses regardless of whether they are of the same type or different types.

In the camera 100, a light beam passing through the imaging lens 300 passes through a camera mount 106 and enters an optical viewfinder 104 upon being reflected upward by a main mirror 130. The optical viewfinder 104 allows the operator to image an object while observing it as an optical image. The optical viewfinder 104 is provided with some functions of a display unit 54, for example, a focus display function, a camera shake warning display function, an aperture value display function, and an exposure correction display function.

The main mirror 130 is formed from a half mirror having semi-transparency. Part of the light beam entering the main mirror 130 passes through the half mirror and enters a focus detection apparatus 105 upon being reflected downward by a sub-mirror 131. The focus detection apparatus 105 uses a phase difference detection AF mechanism formed from a secondary imaging optical system, converts an obtained optical image into an electrical signal, and sends it to an AF unit (AutoFocus unit) 42. The AF unit 42 performs phase difference detection calculation from this electrical signal. The system control unit 50 controls focus adjustment processing or the like for a focus control unit 342 (to be described later) of the imaging lens 300 based on this calculation result. In this embodiment, the AF unit 42 also corrects a focus detection result. The AF unit 42 functions as a phase difference calculation unit.

When performing still image capturing, electronic viewfinder display, or moving image capturing upon completion of focus adjustment processing for the imaging lens 300, a quick return mechanism (not shown) causes the main mirror 130 and the sub-mirror 131 to retract outside an imaging light beam. The light beam passing through the imaging lens 300 enters an image pickup device 14, which converts an optical image into an electrical signal, through a shutter 12 for controlling the amount of exposure. After the completion of these imaging operations, the main mirror 130 and the sub-mirror 131 return to positions like those shown in FIG. 1.

The electrical signal photo-electrically converted by the image pickup device 14 is sent to an A/D converter 16, which converts the analog signal output into a digital signal (image data). Reference numeral 18 denotes a timing generation circuit which supplies clock signals and control signals to the image pickup device 14, the A/D converter 16, and a D/A converter 26. A memory control circuit 22 and a system control circuit 50 control the timing generation circuit 18. An image processing circuit 20 performs predetermined pixel interpolation processing or predetermined color conversion processing for image data from the A/D converter 16 or image data from the memory control circuit 22. The image processing circuit 20 performs predetermined calculation processing by using the image data.

The image pickup device 14 has part of the focus detection apparatus and can perform phase difference detection AF even in a state in which the quick return mechanism has caused the main mirror 130 and sub-mirror 131 to retract outside an imaging light beam. The image processing circuit 20 converts image data, of the obtained image data, which corresponds to focus detection into focus detection image data. This data is then sent to the AF unit 42 via the system control circuit 50. The focus adjustment apparatus focuses the imaging lens 300. Note that the system control circuit 50 is configured to be also able to perform so-called contrast AF of performing focusing with respect to the focus control unit 342 of the imaging lens 300 based on the calculation result obtained by the image processing circuit 20 by calculating image data from the image pickup device 14. At the time of electronic viewfinder observation or moving image capturing, although the main mirror 130 and the sub-mirror 131 retract outside an imaging light beam, the system control circuit 50 can perform both phase different detection AF using the image pickup device 14 and contrast AF. Since the system control circuit 50 can perform phase difference detection AF, in particular, it is possible to perform focusing at high speed.

As described above, the camera 100 according to this embodiment uses phase difference detection AF using the focus detection apparatus 105 at the time of ordinary still image capturing, with the main mirror 130 and the sub-mirror 131 being located in an imaging optical path. In addition, at the time of electronic viewfinder observation or moving image capturing, while the main mirror 130 and the sub-mirror 131 retract outside an imaging light beam, the system control circuit 50 uses phase difference detection AF using the image pickup device 14 and contrast AF. It is therefore possible to perform focus adjustment at any imaging operation including still image capturing, electronic viewfinder operation, and moving image capturing.

The memory control circuit 22 controls the A/D converter 16, the timing generation circuit 18, the image processing circuit 20, an image display memory 24, the D/A converter 26, a memory 30, and a compression/decompression circuit 32. Data from the A/D converter 16 is written in the image display memory 24 or the memory 30 via the image processing circuit 20 or the memory control circuit 22 or directly via the memory control circuit 22. An image display unit 28 is formed from a liquid crystal monitor or the like and displays image data for display, written in the image display memory 24, via the D/A converter 26. Sequentially displaying captured image data by using the image display unit 28 can implement an electronic viewfinder function. The image display unit 28 can arbitrarily turn display on and off in accordance with an instruction from the system control circuit 50. When the image display unit 28 turns off display, it is possible to greatly reduce the power consumption of the camera 100.

In addition, the memory 30 is configured to store captured still images and moving images, and has a storage capacity sufficient to store a predetermined number of still images or a moving image for a predetermined time. This makes it also possible to write a large amount of image data in the memory 30 at high speed at the time of continuous shooting or panoramic shooting. In addition, the memory 30 can be used as a work area for the system control circuit 50. The compression/decompression circuit 32 has a function of compressing/decompressing image data by ADCT (Adaptive Discrete Cosine Transform) or the like. The compression/decompression circuit 32 reads an image stored in the memory 30, performs compression processing or decompression processing for the image, and writes the processed image data in the memory 30.

A shutter control unit 36 controls the shutter 12 in cooperation with a stop control unit 344 which controls a stop 312 on the imaging lens 300 side based on photometric information from a photometric unit 46. An interface unit 38 and a connector 122 electrically connect the camera 100 to the imaging lens 300. The interface unit 38 and the connector 122 exchange control signals, state signals, data signals, and the like between the camera 100 and the imaging lens 300 and also has a function of supplying currents of various voltages. Alternatively, they may be configured to perform optical communication, voice communication, and the like as well as electrical communication. The photometric unit 46 performs AE processing. It is possible to measure the exposed state of an image by making a light beam passing through the imaging lens 300 enter the photometric unit 46 through the camera mount 106, the main mirror 130; and a photometric lens (not shown). The photometric unit 46 also has a dimming processing function in cooperation with a flash unit 48. Note that the system control circuit 50 can also perform AE control for the shutter control unit 36 and the stop control unit 344 of the imaging lens 300 based on the calculation result obtained by the image processing circuit 20 by calculating image data from the image pickup device 14. The flash unit 48 has an AF auxiliary light projection function and a flash dimming function.

The system control circuit 50 controls the overall camera 100, and the memory 52 stores constants, variables, programs, and the like for the operation of the system control circuit 50. The display unit 54 is a liquid crystal display apparatus which displays an operation state, a message, and the like by using characters, images, sounds, and the like in accordance with the execution of programs by the system control circuit 50. One or a plurality of display units are installed at positions near the operation unit of the camera 100 at which visual recognition is facilitated, and are formed from a combination of LCDs, LEDs, and the like. Information of the contents displayed on the display unit 54 which is displayed on an LCD or the like includes information concerning the number of images captured such as the number of images recorded or the remaining possible number of exposures and information concerning imaging conditions such as a shutter speed, aperture value, exposure correction value, and flash value. The display unit 54 also displays a remaining battery capacity, date/time, and the like. Furthermore, as described above, some functions of the display unit 54 are implemented in the optical viewfinder 104.

A nonvolatile memory 56 is a memory capable of electrically erasing and recording data. For example, an EEPROM or the like is used as the nonvolatile memory 56. Reference numerals 60, 62, 64, 66, 68, and 70 denote operation units for inputting various types of operation instructions for the system control circuit 50. These operation units are formed from one or a plurality of combinations of switches, a dial, a touch panel, a pointing device based on line-of-sight detection, and a voice recognition apparatus.

The mode dial switch 60 can perform switching setting for the respective function modes such as a power supply OFF mode, automatic imaging mode, manual imaging mode, playback mode, and PC connection mode. When the operator presses the shutter button (not shown) halfway, the shutter switch SW1 62 is turned on to issue an instruction to start operation such as AF processing, AE processing, AWB processing, or EF processing. When the operator fully presses the shutter button, a shutter switch SW2 64 is turned on to issue an instruction to start a series of processing operations associated with imaging. Processing associated with imaging includes exposure processing, developing processing, and recording processing. In exposure processing, the signal read out from the image pickup device 14 is written as image data in the memory 30 via the A/D converter 16 and the memory control circuit 22. In developing processing, developing is performed by using calculation by the image processing circuit 20 or the memory control circuit 22. In recording processing, the compression/decompression circuit 32 reads out image data from the memory 30, compresses the data, and writes the resultant data as image data in a recording medium 200 or 210.

The image display ON/OFF switch 66 can perform ON/OFF setting for the image display unit 28. With this function, it is possible to achieve power saving by stopping power supply to the image display unit formed from a liquid crystal monitor or the like when performing imaging by using the optical viewfinder 104. The quick review ON/OFF switch 68 sets a quick review function of automatically playing back image data captured immediately after imaging. The operation unit 70 is formed from various types of buttons, a touch panel, and the like. The various types of buttons include a menu button, flash setting button, single shooting/continuous shooting/self-timer switching button, and exposure correction button.

A power supply control unit 80 includes a battery detection circuit, a DC/DC converter, and a switch circuit for switching blocks to be energized. The power supply control unit 80 detects the presence/absence of a battery, the type of battery, and a remaining battery capacity, controls the DC/DC converter based on the detection result and an instruction from the system control circuit 50, and applies necessary voltages to the respective units including the recording medium for necessary periods. Connectors 82 and 84 connect a power supply unit 86 to the camera 100. The power supply unit 86 includes a primary battery such as an alkali battery or lithium battery, a secondary battery such as a NiCd battery, NiMH battery, or lithium-ion battery, and an AC adapter.

Interfaces 90 and 94 have connecting functions for recording media such as a memory card and a hard disk. Connectors 92 and 96 perform physical connection with respect to recording media such as a memory card and a hard disk. A recording medium attachment/detachment detection unit 98 detects whether a recording medium is attached to the connector 92 or 96. Note that this embodiment has exemplified the interfaces and the connectors for the attachment of recording media which have two systems. However, interfaces and connectors may be configured to have one or a plurality of systems. Alternatively, interfaces and connectors with different specifications may be combined. In addition, connecting various types of communication cards such as a LAN card to interfaces and connectors can transfer image data and management information attached to the image data between other peripheral devices such as a computer and a printer.

A communication unit 110 has various types of communication functions such as a wired communication function and a wireless communication function. A connector 112 connects the camera 100 to other devices via the communication unit 110 and functions as an antenna at the time of wireless communication. The recording media 200 and 210 include a memory card and a hard disk. The recording media 200 and 210 respectively include recording units 202 and 212 formed from a semiconductor memory, a magnetic disk, and the like, interfaces 204 and 214 for the camera 100, and connectors 206 and 216 for connection to the camera 100.

The imaging lens 300 side will be described next. The imaging lens 300 is configured to be detachably attached to the camera 100. A lens mount 306 mechanically couples the imaging lens 300 to the camera 100 and is interchangeably mounted on the camera 100 through the camera mount 106. The camera mount 106 and the lens mount 306 respectively include the functions of the connector 122 and a connector 322 which electrically connect the imaging lens 300 to the camera 100. A lens 311 includes a focus lens for focusing on an object. The stop 312 is a stop for controlling the amount of imaging light beam.

The connector 322 and an interface 338 electrically connect the imaging lens 300 to the connector 122 of the camera 100. The connector 322 exchanges control signals, state signals, data signals, and the like between the camera 100 and the imaging lens 300 and also has a function of receiving currents of various voltages. The connector 322 may be configured to perform not only electrical communication but also optical communication, voice communication, and the like. A zoom control unit 340 controls the zooming of the lens 311. The focus control unit 342 controls the operation of the focus lens of the lens 311. The imaging lens 300 may not include the zoom control unit 340 if the lens is of a single focus lens type without any zoom function. The stop control unit 344 controls the stop 312 in cooperation with the shutter control unit 36, which controls the shutter 12, based on photometric information from the photometric unit 46. The stop control unit 344 and the stop 312 constitute a stop aperture adjustment unit.

A lens system control unit 346 controls the overall imaging lens 300. The lens system control unit 346 has the function of a memory which stores constants, variables, programs, and the like for the operation of the imaging lens. A nonvolatile memory 348 stores identification information such as the number unique to the imaging lens, management information, functional information such as maximum and minimum aperture values and a focal length, current and past set values, and the like. In this embodiment, this memory also stores lens frame information corresponding to the state of the imaging lens 300. This lens frame information is information about the distance of a frame aperture from the image pickup device 14 and the radius of the frame aperture which decide a light beam passing through the imaging lens. The stop 312 is included in the frame which decides a light beam passing through the imaging lens. The frame also corresponds to, for example, the aperture of lens frame component which holds the lens. In addition, a frame which decides a light beam passing through the imaging lens differs depending on the focus position and zoom position of the lens 311. For this reason, a plurality of frames are prepared in correspondence with different focus positions and zoom positions of the lens 311. When the camera 100 performs focus detection by using the focus detection unit, optimal lens frame information corresponding to the focus position and zoom position of the lens 311 is selected and sent to the camera 100 via the connector 322.

The above is the arrangement of the camera system including the camera 100 and the imaging lens 300. The focus detection apparatus formed from the image pickup device 14 will be described in detail next. This focus detection apparatus uses phase difference detection AF like the focus detection apparatus 105. The arrangement of this apparatus will be described.

Figure 2:
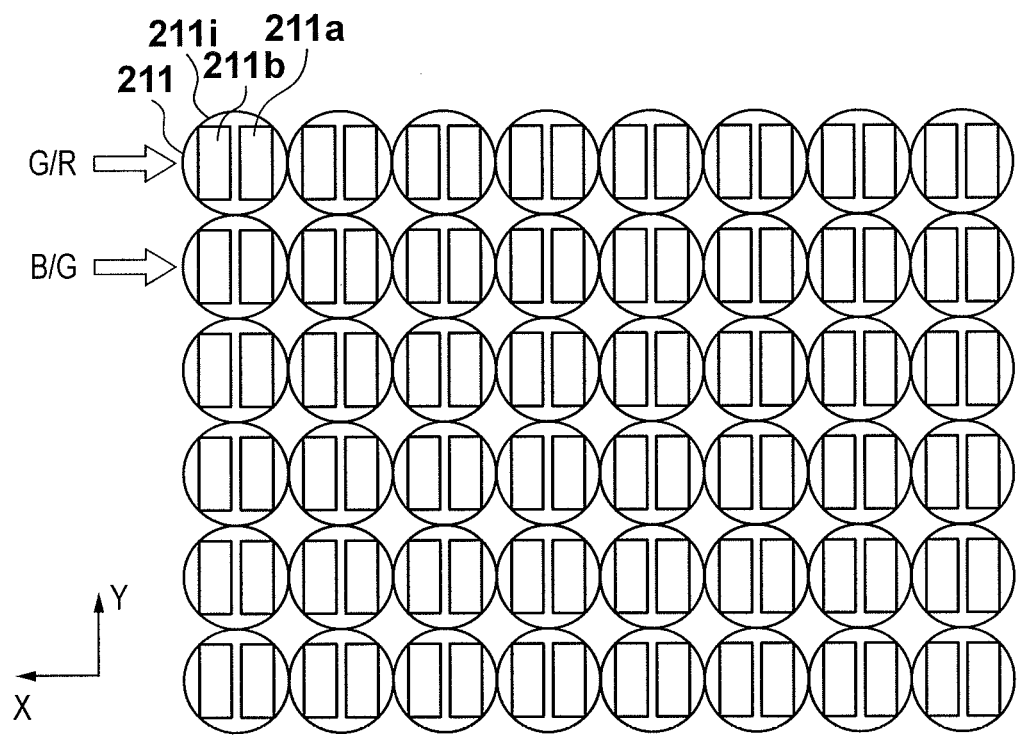
FIG. 2 is a view showing the pixel array of an image pickup device.

FIG. 2 is a view showing the pixel array of the image pickup device according to this embodiment. FIG. 2 shows a state in which the range of 6 rows in the vertical direction (Y direction)×8 columns in the horizontal direction (X direction) of a two-dimensional C-MOS area sensor is observed from the imaging optical system side. A Bayer array is applied to color filters. That is, green and red color filters are alternately provided on the pixels on the odd-numbered rows sequentially from the left. In addition, blue and green color filters are alternately provided on the pixels on the even-numbered rows sequentially from the left. A circle 211$i$ represents an on-chip microlens. A plurality of rectangles arranged inside the on-chip microlens respectively represent photo-electric conversion units.

In this embodiment, the photo-electric conversion unit of every pixel is divided into two areas in the X direction. Each pixel is configured to independently read out a photo-electric conversion signal from one divided area and the sum of two photo-electric conversion signals. The independently readout signals enable to obtain a signal corresponding to a signal obtained from the other photo-electric conversion area by calculating the difference between the sum of the two photo-electric conversion signals and the photo-electric conversion signal from one divided area. Photo-electric conversion signals from these divided areas are used for phase difference focus detection by a method (to be described later) and enable to generate a 3D (3-Dimensional) image constituted by a plurality of images having parallax information. On the other hand, the sum of the two photo-electric conversion signals is used as an ordinary captured image.

Pixel signals for phase difference focus detection will be described below. As described later, in this embodiment, the microlens 211$i$ in FIG. 2 and divided photo-electric conversion units 211$a$ and 211$b$ pupil-divide a light beam emerging from the imaging optical system. Assume that an image composed by concatenating outputs from the photo-electric conversion units 211$a$ in a plurality of pixels 211 in a predetermined range arranged on the same row will be referred to as an AF A image, and an image composed by concatenating outputs from the photo-electric conversion units 211$b$ in the same pixels will be referred to as an AF B image. Detecting the relative image shift amount between the AF A image and the AF B image generated in this manner by correlation calculation can detect a focus shift amount in a predetermined area, that is, a defocus amount. In this embodiment, although the image pickup device does not output one of the AF A image and the AF B image, since the device outputs the sum of the A image output and the B image output, it is possible to obtain the other signal from the difference between the output and the other output. This makes it possible to perform focus detection.

This embodiment is configured to generate an AF A image and an AF B image by adding outputs from several pixels in order to, for example, reduce the calculation load, increase the S/N ratio of an output signal, and adjust to an output image size. This calculation method will be described later. A plurality of photo-electric conversion units 211a will be referred to as a first pixel group, and a plurality of photo-electric conversion units 211b will be referred to as a second pixel group.

The above image pickup device can be manufactured by using the technique disclosed in Japanese Patent Laid-Open No. 2004-134867, and hence a description of the detailed structure will be omitted.

Figure 3:
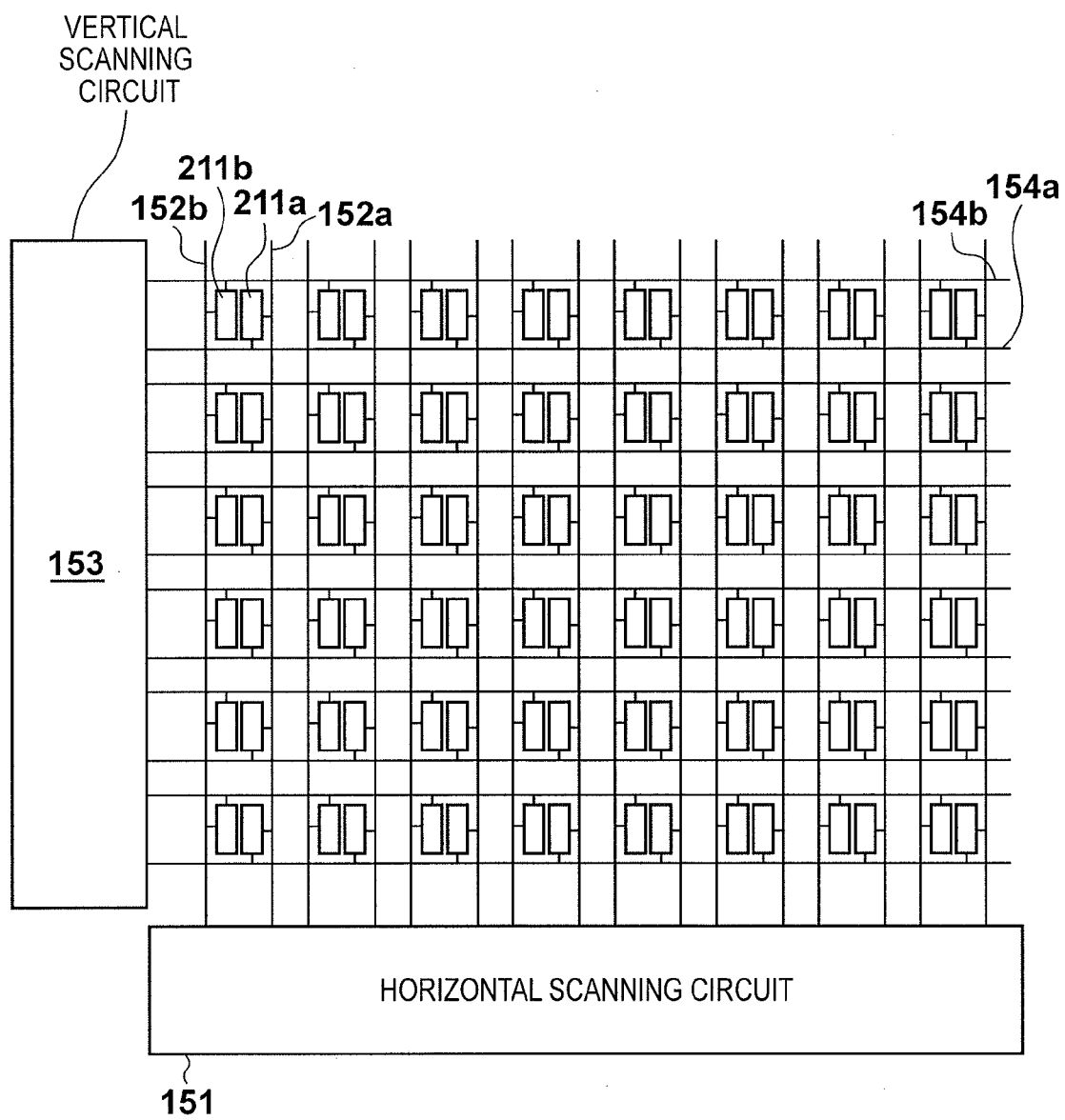
FIG. 3 is a block diagram showing the arrangement of a readout circuit in the image pickup device.

FIG. 3 is a view showing the arrangement of a readout circuit in the image pickup device according to this embodiment. Reference numeral 151 denotes a horizontal scanning circuit; and 153, a vertical scanning circuit. Horizontal scanning lines 152a and 152b and vertical scanning lines 154a and 154b are arranged on the boundary portions between the respective pixels. Signals are read out from the respective photo-electric conversion units to the outside via these scanning lines.

Note that the image pickup device according to this embodiment has two types of readout modes. The first readout mode is called an all-pixel readout mode, which is used to capture a high-resolution still image. In this case, signals are read out from all the pixels.

The second readout mode is called a thinning-out readout mode, which is used to only record a moving image or display a preview image. In this case, since the number of pixels required is smaller than the total number of pixels, the apparatus reads out signals from only pixels remaining after thinning out the pixel groups at a predetermined ratio in both the X and Y directions. When it is necessary to read out signals at high speed, the apparatus also uses the thinning-out readout mode. When thinning out pixels in the X direction, the apparatus increases the S/N ratio by adding signals. When thinning out pixels in the Y direction, the apparatus ignores signal outputs from thinned out rows.

FIGS. 4A and 4B are views for explaining the conjugate relationship between the exit pupil plane of the imaging optical system and photo-electric conversion units of the image pickup device which are arranged near a portion corresponding to an image height of 0, that is, the middle of an image plane. The photo-electric conversion units in the image pickup device and the exit pupil plane of the imaging optical system are designed with on-chip microlenses to have a conjugate relationship. In general, the exit pupil of the imaging optical system almost coincides with a plane on which an iris stop for light amount adjustment is placed. On the other hand, the imaging optical system according to this embodiment is a zoom lens having a variable power function. An imaging optical system of some optical type changes in distance from an image plane of the exit pupil or size upon power changing operation. FIGS. 4A and 4B show a state in which the focal length of the imaging optical system corresponds a middle position between the wide-angle end the telephoto end, that is, Middle. Assuming this distance as a standard exit pupil distance Zep, eccentricity parameters are optimally designed in accordance with the shape of an on-chip microlens and an image height (X- and Y-coordinates).

Referring to FIG. 4A, reference numeral 101 denotes a first lens group; 101b, a lens barrel member which holds the first lens group; 105, a third lens group; 105b, a lens barrel member which holds the third lens group; 102, a stop; 102a, an aperture plate which defines an aperture diameter at full aperture; and 102b, aperture blades for adjusting the aperture diameter at the time of stop-down operation. Note that the members 101b, 102a, 102b, and 105b functioning as members for restricting a light beam passing through the imaging optical system are shown in the form of virtual images when observed from an image plane. In addition, the synthetic aperture near the stop 102 is defined as the exit pupil of the lens, and the distance from the image plane is represented by Zep, as described above.

Reference numeral 2110 denotes a pixel for photo-electrically converting an object image. This pixel is placed near the middle of the image plane and will be referred to as a middle pixel in this embodiment. The middle pixel 2110 includes, from the lowermost layer, photo-electric conversion units 2110a and 2110b, wiring layers 2110e to 2110g, a color filter 2110h, and an on-chip microlens 2110i. The on-chip microlens 2110i projects the two photo-electric conversion units onto the exit pupil plane of the imaging optical system. In other words, the exit pupil of the imaging optical system is projected on the surfaces of the photo-electric conversion units through the on-chip microlens 2110i.

FIG. 4B shows projection images of the photo-electric conversion units on the exit pupil plane of the imaging optical system. Projection images of the photo-electric conversion units 2110a and 2110b are respectively represented by EP1a and EP1b. In addition, in this embodiment, the image pickup device includes a pixel which enables to obtain an output from one of the two photo-electric conversion units 2110a and 2110b and the sum of outputs from the two photo-electric conversion units. The sum of outputs from the two photo-electric conversion units is the value obtained by photo-electrically converting light beams passing through the two areas of the projection images EP1a and EP1b which correspond to almost the entire pupil area of the imaging optical system. The projection image EP1a is called a first pupil area, and the projection image EP1b is called a second pupil area.

Referring to FIG. 4A, letting L be the outermost portion of a light beam passing through the imaging optical system, the light beam L is restricted by the aperture plate 102a, and the imaging optical system generates almost no vignette on the projection images EP1a and EP1b. Referring to FIG. 4B, let TL be the light beam L in FIG. 4A. Obviously, since the circle represented by TL includes most parts of the projection images EP1a and EP1b of the photo-electric conversion units, and almost no vignette has occurred. Since the light beam L is restricted by only the aperture plate 102a of the stop, the circle TL can be redefined as the aperture plate 102a. In this case, at the middle of the image plane, the vignette state of each of the projection images EP1a and EP1b is symmetrical with respect to the optical axis, and the photo-electric conversion units 2110a and 2110b receive the same amount of light.

As described with reference to FIGS. 2, 3, and 4, the image pickup device 14 has not only the imaging function but also a function as a focus detection apparatus. In addition, the image pickup device 14 can perform phase difference detection AF as a focus detection method because it includes focus detection pixels which receive light beams that have divided the exit pupil.

Figure 5:
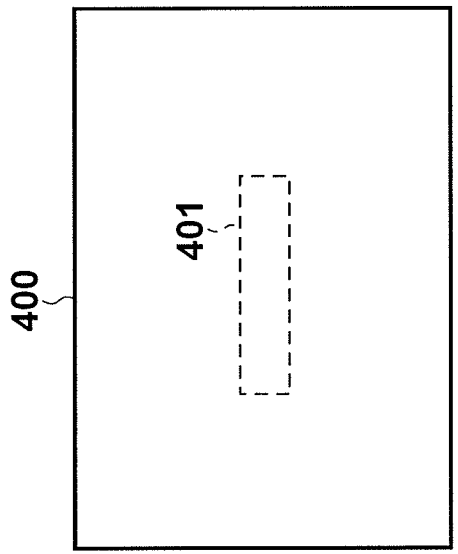
FIG. 5 is a view showing a focus detection area in an imaging range.

FIG. 5 shows a focus detection area 401 in an imaging range 400. The image pickup device 14 performs phase difference detection AF in this focus detection area (the focus detection sensor on the imaging plane (light-receiving surface)). In the focus detection area 401, the image pickup device 14 performs phase difference detection by using a contrast difference in the horizontal direction in the imaging range 400. In the focus detection area 401, the pixels 2110 are arranged in a 2 row×2N column array. In this embodiment, the pixels used for focus detection are arranged in a 2 row×2N column array. However, the numbers of rows and columns are not limited to them. The number of rows may be a predetermined number equal to or more than 2, and the number of columns may be properly set within the range in which a phase difference can be detected.

Figure 6:
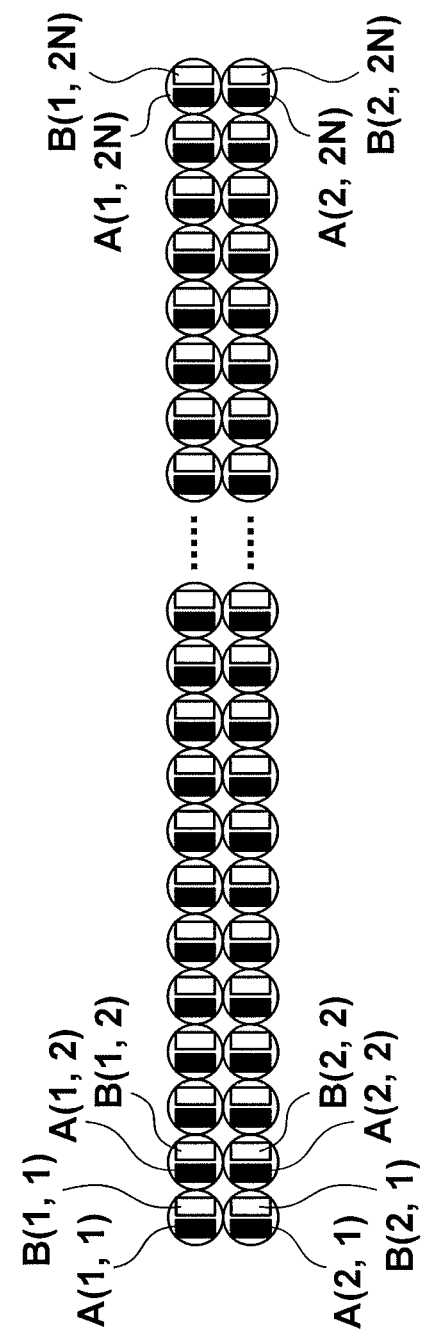
FIG. 6 is a view showing the 2 row×2N column pixels arranged in a focus detection area.

FIG. 6 shows 2 row×2N column pixels arranged in the focus detection area 401. Let A(i, j) be a pixel to be used to generate a signal for an AF A image at the ith row and jth column, and B(i, j) be a pixel to be used to generate a signal for an AF B image at the ith row and jth column.

This embodiment uses the sum of outputs from two pixels to reduce the calculation load, increase the S/N ratio of an output signal, and adjust to an output image size. Letting As(i, k) and Bs(i, k) be a signal for the kth AF A image and a signal for the kth AF B image on the ith row, the respective signals are calculated by $$As(1,k)=A(1,2\times(k-1)+1)+A(1,2\times(k-1)+2)$$

$$Bs(1,k)=B(1,2\times(k-1)+1)+B(1,2\times(k-1)+2)$$

$$As(2,k)=A(2,2\times(k-1)+2)+A(2,2\times(k-1)+3)$$

$$Bs(2,k)=B(2,2\times(k-1)+2)+B(2,2\times(-1)+3)$$

$$(1 \leq k \leq N-1) \quad (1)$$

This embodiment performs phase difference detection by using an AF A image signal and an AF B image signal each having N−1 signals, each obtained by adding outputs from two pixels, for each row. A phase difference detection method using these two pairs of signals will be described later. An AF A image signal as the first image signal group constituted by output signals from the first pixel group has two rows of pixel columns in a direction (the vertical direction in FIG. 6) perpendicular to the phase difference detection direction. This indicates that the first pixel group is constituted by pixel columns of a predetermined number of rows equal to or more than two arranged in a direction perpendicular to the pixel column direction. In other words, the predetermined number of rows in this case is two in FIG. 6.

In addition, in the AF A image signal as the first image signal group, sampling positions on the object shift from each other by half the sampling pitch between the first-row signal and the second-row signal in the phase difference detection direction. This indicates that the first image signal group has a difference amount of an integer multiple of the value obtained by dividing a predetermined interval by a predetermined number of rows in the pixel column direction relative to a sampling position. In other words, in the above case, the predetermined interval corresponds to 2 pixels, and the first image signal group has a difference amount of an integer multiple of 1 pixel (one time, that is, 1 pixel in the above case) obtained by dividing the predetermined interval by 2 (rows) as the predetermined number of rows.

The operation of the camera 100 will be described next. FIG. 7 is a flowchart showing focus adjusting operation stored in the system control circuit 50. Note that this flowchart is for focus adjusting operation at the time of electronic viewfinder observation or moving image capturing, at which the apparatus performs phase difference detection AF using the image pickup device 14 while making the main mirror 130 and the sub-mirror 131 retract outside an imaging light beam. That is, the apparatus performs display operation for the electronic viewfinder or moving image recording concurrently with focus adjusting operation.

First of all, in step S501, the apparatus detects whether the operator has turned on the focus detection start instruction button by operating SW1 or an operation unit 70. If YES in step S501, the process advances to step S502. Although the apparatus performs discrimination based on the focus detection start button, the apparatus may start focus detection by being triggered by transition to electronic viewfinder display or moving image recording.

In step S502, the apparatus acquires various types of lens information such as the above lens frame information and focus lens position of the imaging lens 300 via the interface units 38 and 338 and the connectors 122 and 322. In step S503, the apparatus generates a pair of focus detection signals from sequential readout image data by using the combining unit and concatenating unit of the image processing unit 20. In this embodiment, the apparatus generates an AF A image signal and an AF B image signal on two rows described above. The apparatus sends these signals to the AF unit 42 to perform light amount correction and the like.

In step S504, the AF unit 42 calculates the shift amount between a pair of focus detection signals by using a known correlation calculation unit or the like and converts the shift amount into a defocus amount. This operation will be described in detail later. In step S505, the apparatus calculates the lens driving amount of the imaging lens 300 based on the focus detection result calculated in step S504. In step S506, the apparatus sends the lens driving amount to the focus control unit 342 of the imaging lens 300 via the interface units 38 and 338 and the connectors 122 and 322 to drive the focus lens, thereby performing focus adjustment for the imaging lens 300.

The calculation of a defocus amount in step S504 in FIG. 7 will be described next. FIG. 8 is a flowchart for a defocus amount calculation subroutine. When the process advances from step S504 in the main routine to the subroutine, the process advances to step S5041 to perform correlation calculation using an AF A image on the first row and an AF B image on the first row. A correlation amount COR1(k) used for correlation calculation is calculated by $$COR1(k) = \sum_{i=1}^{N-1-2\times kmax} |As(1, i-k) - Bs(1, i+k)| \quad (2)$$

$$(-kmax \leq k \leq kmax)$$

Note that k used in equation (2) is a shift amount at the time of correlation calculation and is an integer equal to or more than −kmax and equal to or less than kmax. The apparatus then obtains the value of k when an AF A image and an AF B image exhibit the highest correlation, that is, a correlation amount COR1 becomes the minimum. In this case, when the apparatus calculates the value of k in the form of an integer, the resolution deteriorates. For this reason, the apparatus performs interpolation processing as needed, and performs so-called subpixel calculation.

This embodiment is configured to calculate a difference from the correlation amount COR1 and detect a shift amount dk at which the difference amount changes in sign. A difference DCOR1 is calculated by $$DCOR1(k)=COR1(k)-COR1(k-1) \quad (3)$$

The apparatus detects a shift amount dk1 at which the difference amount changes in sign by using the difference amount DCOR1 of the correlation amount COR1. Letting k1 be the value of k immediately before the sign changes and k2 (k2=k1+1) be the value of k immediately after the sign has changed, a shift amount dk is calculated by $$dk1 = k1 + |DCOR1(k1)|/|DCOR1(k1) - DCOR1(k2)| \quad (4)$$

The apparatus calculates the shift amount dk1 between the AF A image and the AF B image with a resolution equal to or less than one pixel, and terminates the processing in step S5041. There are various types of known methods of calculating the above phase difference. This embodiment may use another method.

In step S5042, upon calculating a correlation amount COR2 by using an AF A image on the second row and an AF B image on the second row in the same manner as described above, the apparatus calculates a difference DCOR2 of the correlation amount, and then calculates a shift amount dk2.

In step S5043, upon calculating a correlation amount COR3 by using the AF A image on the first row and the AF B image on the second row in the same manner as described above, the apparatus calculates a difference DCOR3 of the correlation amount, and then calculates a shift amount dk3.

In step S5044, upon calculating a correlation amount COR4 by using the AF A image on the second row and the AF B image on the first row in the same manner as described above, the apparatus calculates a difference DCOR4 of the correlation amount, and then calculates a shift amount dk4.

In step S5045, the apparatus calculates a defocus amount DEF by using the four types of shift amounts dk1, dk2, dk3, and dk4 calculated so far. In this embodiment, it is possible to obtain a detection result with a small error by using the four types of shift amounts dk1, dk2, dk3, and dk4 when calculating the defocus amount DEF.

Errors that occur when calculating a shift amount will be described below. Errors that occur when calculating a shift amount may include an error that occurs when sampling an object and an error that occurs when calculating a shift amount by using the above subpixel calculation.

An error that occurs when sampling an object originates from folding noise caused by the influence of harmonic components of the spatial frequencies of the object. The amount of error that occurs differs depending on a sampling position on the object. The shift amount dk1 calculated by using the AF A image on the first row and the AF B image on the first row and the shift amount dk2 calculated by using the AF A image on the second row and the AF B image on the second row differ in their sampling positions on the object in the phase difference detection direction. For this reason, the errors contained in the calculated shift amount differ in their amounts. An AF signal on the first row and an AF signal on the second row each are the sum of outputs from two pixels, and the sampling positions on the object differ from each other by one pixel. Like an AF signal on the first row and an AF signal on the second row, signals generated by sampling an object at positions shifted from each other by half a pitch have errors occurring in the opposite (positive and negative) directions at the time of sampling the object. Therefore, averaging the two shift amount calculation results dk1 and dk2 can reduce the influence of the errors.

An error that occurs when calculating a shift amount by using subpixel calculation is caused by the difference between a correlation amount difference function and a fitting function at the time of shift amount calculation.

Figure 9A:
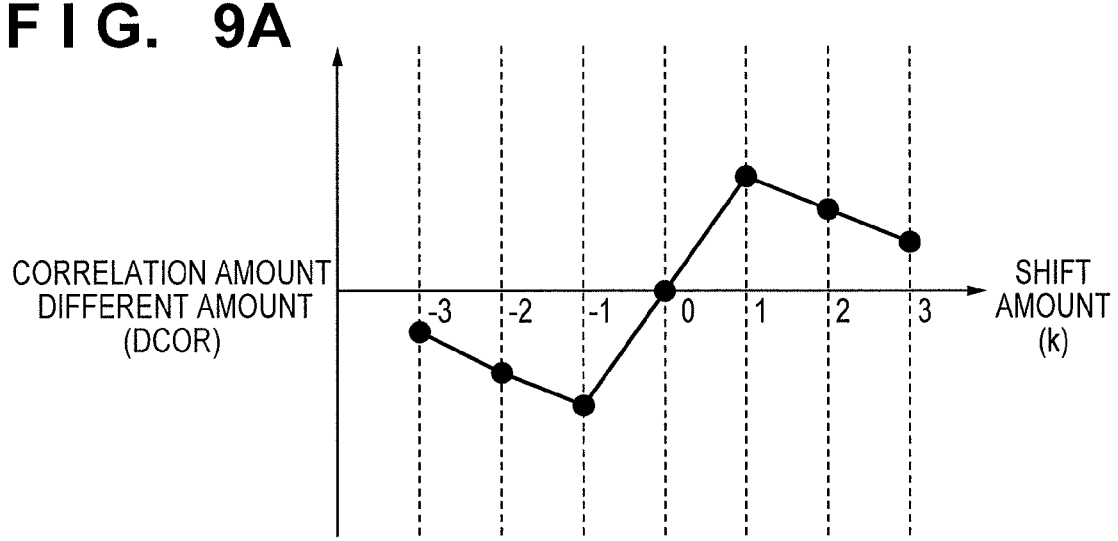
FIG. 9A is a graph showing an example of a correlation amount difference amount for each shift amount.
Figure 9B:
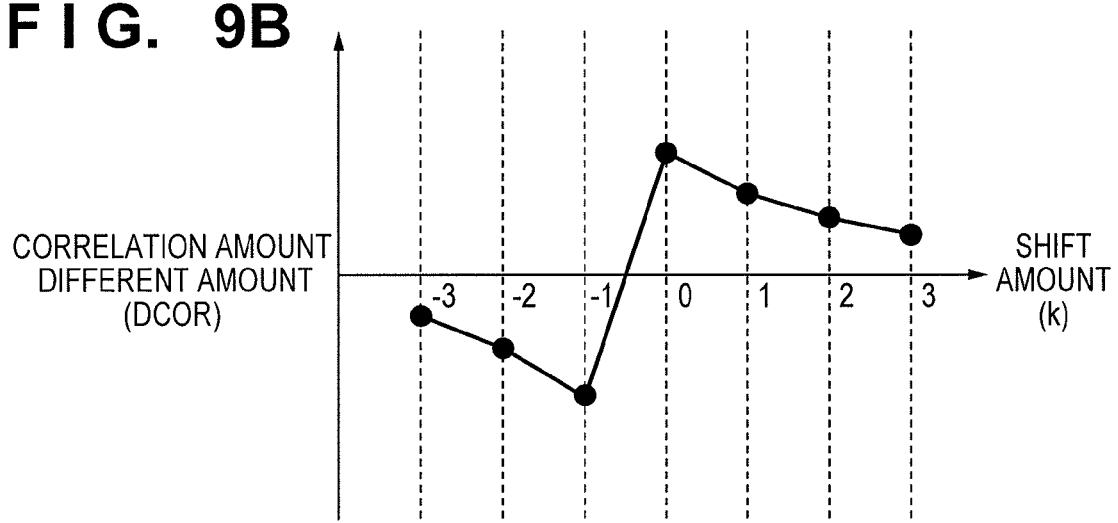
FIG. 9B is a graph showing an example of a correlation amount difference amount for each shift amount.
Figure 9C:
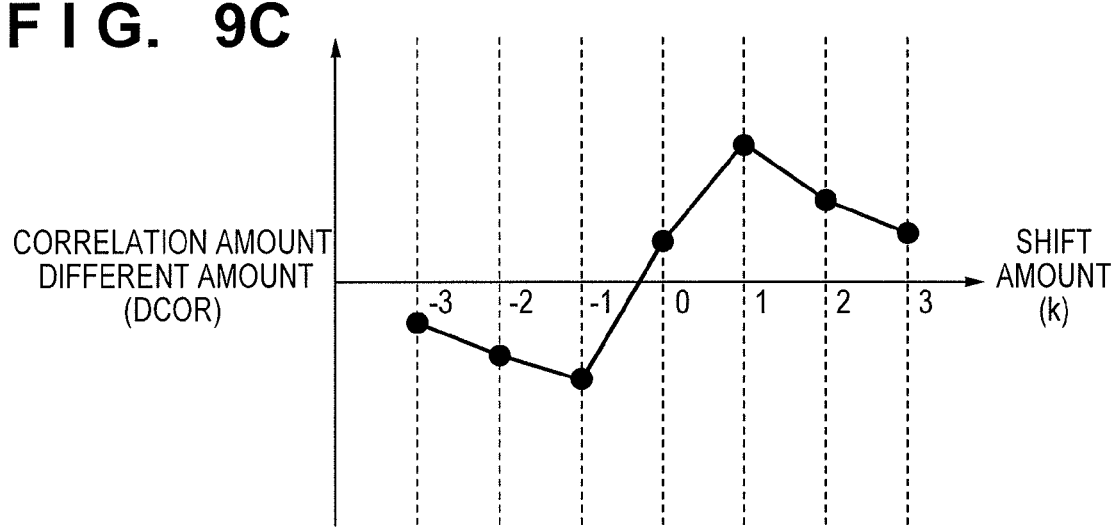
FIG. 9C is a graph showing an example of a correlation amount difference amount for each shift amount.

FIGS. 9A to 9C are graphs showing examples of a correlation amount difference amount for each shift amount in various states. FIG. 9A shows a case in which when shift amount k=0, a correlation amount difference amount is given as DCOR=0. In this case, it is unnecessary to calculate a shift amount by using subpixel calculation, and the shift amount finally calculated is given as dk=0. In the case shown in FIG. 9A, since it is not necessary in the first place to perform subpixel calculation, an error that occurs when calculating a shift amount by using subpixel calculation is small.

In addition, FIG. 9B shows a case in which a correlation amount difference amount changes in sign between shift amount k=−1 and shift amount k=0, and the correlation amount difference amount DCOR when shift amount k=−1 is equal in absolute value to the correlation amount difference amount DCOR when shift amount k=0. In this case, the shift amount calculated finally is given as dk=−0.5.

In the case of FIG. 9B, the function of the correlation amount difference amount has an almost point-symmetrical shape with respect to an intersection point with the X-axis (the axis of the shift amount (k)). For this reason, the shift amount calculated finally is given as dk=−0.5 regardless of the fitting function used for the calculation of a shift amount from a correlation amount difference function, and an error that occurs when calculating a shift amount by using subpixel calculation is small.

In the case of FIG. 9C, a correlation amount difference amount changes in sign between shift amount k=−1 and shift amount k=0, and the correlation amount difference amount DOOR when shift amount k=−1 is larger in absolute value than the correlation amount difference amount DOOR when shift amount k=0. In this case, the shift amount calculated finally is given as dk=−0.25.

In the case of FIG. 9C, the function of the correlation amount difference amount does not have a point-symmetrical shape with respect to an intersection point with the X-axis (the axis of the shift amount (k)). The amount of error contained in the shift amount dk differs depending on the fitting method to be used. This embodiment is configured to perform fitting with a straight line by using the correlation amount difference amount between shift amount k=−1 and shift amount k=0. For example, it is conceivable to use a fitting method using the correlation amount difference amount between other shift amounts. In general, the function of a correlation amount difference amount changes in shape depending on the contrast, pattern, or the like of an object, and different errors occur depending on the fitting method to be used. In the case of FIG. 9C, therefore, it is difficult to set a fitting method exhibiting a small error regardless of the function of a correlation amount difference amount, and a large error tends to occur when calculating a shift amount by using subpixel calculation.

Figure 10:
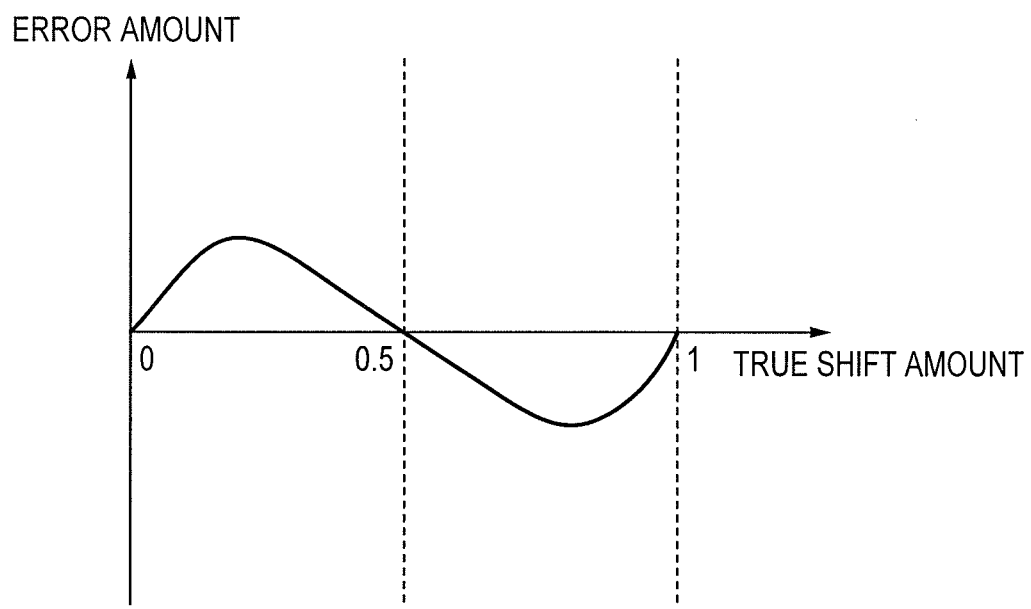
FIG. 10 is a graph showing the amount of error contained in a calculated shift amount.

As described with reference to FIGS. 9A to 9C, the amount of error contained in the calculated shift amount dk differs depending on the shape of the correlation amount different amount calculated with the shift amount k. FIG. 10 shows an example of the amount of error that occurs relative to the shift amount containing no error (the true shift amount).

FIG. 10 shows the amount of error contained in a calculated shift amount as the true shift amount changes from 0 to 1. Even when the true shift amount is not a value between 0 and 1, a curve from 0 to 1 repeatedly appears. For this reason, the state shown in FIG. 9A corresponds to a case in which the true shift amount is 0 or 1, and the state shown in FIG. 9B corresponds to a case in which the true shift amount is 0.5. The state shown in FIG. 9C corresponds to a case in which the true shift amount is 0.75.

Although the amount of error differs depending on the fitting method used when calculating a correlation amount different amount and a shift amount, the error decreases when the true shift amount is almost an integer multiple of 0.5, and increases when the true shift amount is an intermediate value. It is therefore possible to reduce an error by performing averaging processing using the shift amount calculated from a pair of AF signals exhibiting a shift amount of 0 at the time of focusing and the shift amount calculated from a pair of AF signals exhibiting a shift amount of 0.5 at the time of focusing. When, for example, the true shift amount is 0.25, it is possible to reduce an error by performing averaging processing, if a correlation calculation result is obtained such that the true shift amount becomes 0.75.

In addition, the apparatus may reduce an error by selecting a shift amount of an integer multiple of 0.5 from the shift amounts calculated from a plurality of pairs of AF signals exhibiting different shift amounts at the time of focusing.

The calculation of a defocus amount in step S5045 will be described by referring back to FIG. 8. This embodiment uses the shift amounts dk1, dk2, dk3, and dk4 calculated in steps S5041 to S5044 in FIG. 8 to reduce an error that occurs when calculating a shift amount using the above subpixel calculation.

In step S5045, the apparatus calculates dk-ave as the average value of the shift amounts dk1, dk2, dk3, and dk4. The apparatus converts the shift amount into a defocus amount by multiplying the calculated shift amount dk-ave by the sensitivity stored in the nonvolatile memory 56. Upon completing the calculation of a defocus amount, the apparatus terminates the defocus amount calculation subroutine.

This embodiment is configured to reduce an error that occurs when sampling an object by averaging the shift amounts dk1 and dk2 and to reduce an error that occurs when calculating a shift amount by using subpixel calculation, by averaging the shift amounts dk1 and dk3. Likewise, the embodiment is configured to reduce an error that occurs when calculating a shift amount using subpixel calculation, by averaging the shift amounts dk2 and dk4. In addition, the embodiment is configured to reduce an error that occurs when sampling an object at positions shifted from each other in a direction perpendicular to the phase difference detection direction, by averaging the shift amounts dk3 and dk4. In general, when an object is sampled at positions shifted from each other in a direction perpendicular to the phase difference detection direction, a phase difference detection error occurs if the object is a pattern constituted by oblique contrasts. Note that in this embodiment, since errors occur on an object having oblique contrasts in the opposite (positive and negative) positions, it is possible to reduce the errors by averaging the shift amounts dk3 and dk4.

On the other hand, if the operator wants to only reduce an error that occurs when calculating a shift amount using subpixel calculation, the apparatus may calculate a defocus amount from the result obtained by averaging the shift amounts dk1 and dk3. This indicates that the apparatus calculates one phase difference calculation result by using phase difference calculation results on a predetermined number of rows of phase difference calculation results calculated from the image signal selected from the first image signal group and the second image signal.

This makes it possible to always obtain an accurate phase difference detection result with a small error regardless of the shift amount (defocus state) at the time of phase difference detection calculation.

Although this embodiment has performed phase difference detection calculation by adding outputs from two pixels each of which is obtained from the image pickup device 14, the apparatus may perform addition processing inside the image pickup device. Even if addition processing is performed inside the image pickup device as well, it is possible to implement the arrangement of this embodiment by generating signals by sapling an object at different positions for each row.

In addition, although this embodiment has performed phase difference detection calculation after two pixel addition, the number of pixels from which outputs are added is not limited to two. When adding outputs from three pixels, the apparatus generates an AF A image signal and an AF B image signal by using 3 row×3 column pixels as pixels used for focus detection.

$$As(1,k)=A(1,3\times(k-1)+1)+A(1,3\times(k-1)+2)+A(1,3\times(k-1)+3)$$

$$Bs(1,k)=B(1,3\times(k-1)+1)+B(1,3\times(k-1)+2)+B(1,3\times(k-1)+3)$$

$$As(2,k)=A(2,3\times(k-1)+2)+A(2,3\times(k-1)+3)+A(2,3\times(k-1)+4)$$

$$Bs(2,k)=B(2,3\times(k-1)+2)+B(2,3\times(k-1)+3)+B(2,3\times(k-1)+4)$$

$$As(3,k)=A(3,3\times(k-1)+3)+A(3,3\times(k-1)+4)+A(3,3\times(k-1)+5)$$

$$Bs(3,k)=B(3,3\times(k-1)+3)+B(3,3\times(k-1)+4)+B(3,3\times(k-1)+5)$$

$$(1 \le k \le M-1) \quad (5)$$

The apparatus generates three types of AF A images and three types of AF B images according to equations (5). According to the subroutine for defocus amount calculation, it is possible to obtain an accurate phase difference detection result by calculating and averaging a total of nine types of shift amounts, namely shift amounts from three types of AF A image images x three types of AF B images. Even if the number of pixels from which outputs are to be added is increased to decrease the number of signals to be processed, it is possible to obtain the above effect by using signals obtained by sampling an object at positions shifted from each other by an integer multiple of the amount obtained by dividing the sampling pitch of AF signals by the number of pixels from which outputs are added.

In addition, although this embodiment has exemplified the use of a function of the image pickup device 14 as a focus detection apparatus, it is possible to use the focus detection apparatus 105. For example, as the focus detection apparatus 105, the focus detection apparatus disclosed in Japanese Patent Laid-Open No. 2011-100077 may be used. As described at paragraph number 0059 in Japanese Patent Laid-Open No. 2011-100077, a pair of focus detection pixel columns whose positions are shifted from each other in the phase difference detection direction by half a pixel pitch are arranged adjacent to a pair of focus detection pixel columns. In this case, it is possible to obtain the same effect as that described above by calculating and averaging four types of shift amounts by using two types of AF A images and two types of AF B images without performing pixel addition.

Second Embodiment

The second embodiment of the present invention will be described below with reference to FIGS. 11 to 14. The main difference from the first embodiment is in the pixel array of the image pickup device. In the first embodiment, every pixel on the image pickup device is provided with two photoelectric conversion units to obtain output signals of AF A images and AF B images from all the pixels. Since the number of AF signals is large, the S/N ratio of an output signal is high. This makes it possible to obtain an accurate focus detection result. In addition, it is possible to obtain an image with high image quality because imaging pixel signals are obtained from focus detection pixels. Note, however, that since the arrangement of the pixel portions of the image pickup device is complex, and a large calculation amount is required to obtain AF signal outputs or focus detection results, the arrangement costs high.

In the second embodiment, the pixel portions of the image pickup device are configured such that one pixel is made to have only one photo-electric conversion unit by discriminating imaging pixels, AF A image pixels, and AF B image pixels from each other. This simplifies the arrangement of the pixel portions of the image pickup device and can reduce the calculation amount required to obtain AF signal outputs and focus detection results.

Note that the block diagram (FIG. 1) of the image pickup device, the view (FIG. 5) showing the focus detection area in the imaging range, the flowchart (FIG. 7) for explaining focus adjusting operation and defocus amount calculation processing, and the views (FIGS. 9A to 9C and 10) for explaining an error that occurs when calculating a shift amount by using subpixel calculation in the first embodiment are the same as those in the second embodiment, and the same operation is performed in the first and second embodiments. A description of them will therefore be omitted.

Differences between the arrangement of the image pickup device according to the second embodiment and those according to the first embodiment will be described with reference to FIGS. 11 to 13. A focus detection apparatus according to the second embodiment uses phase difference detection AF like the focus detection apparatus 105 according to the first embodiment. The arrangement of this apparatus will be described below.

Figure 11:
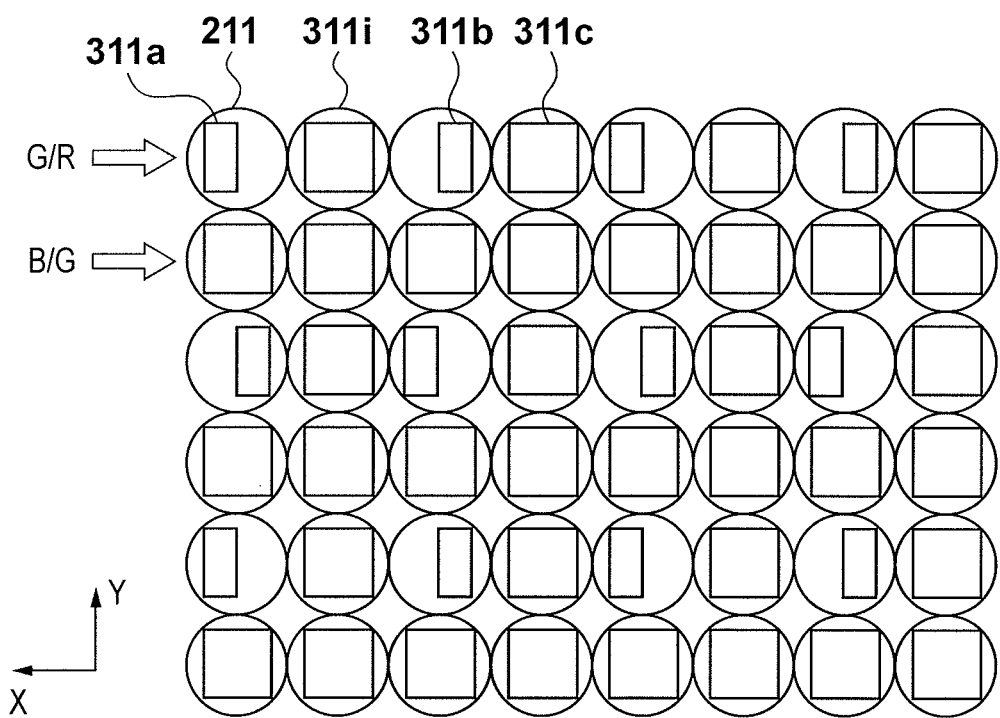
FIG. 11 is a view showing the pixel array of an image pickup device according to the second embodiment.

FIG. 11 is a view showing the pixel array of the image pickup device according to this embodiment. FIG. 2 shows a state in which the range of 6 rows in the vertical direction (Y direction)×8 columns in the horizontal direction (X direction) of a two-dimensional C-MOS area sensor is observed from the imaging optical system side. A Bayer array is applied to color filters. That is, green and red color filters are alternately provided on the pixels on the odd-numbered rows sequentially from the left. In addition, blue and green color filters are alternately provided on the pixels on the even-numbered rows sequentially from the left. A circle 311*i* represents an on-chip microlens. A plurality of rectangles arranged inside the on-chip microlens respectively represent photo-electric conversion units.

In this embodiment, the photo-electric conversion units of the respective pixels differ in area and position in the X direction, and one photo-electric conversion signal is read out from one pixel.

Pixel signals for phase difference focus detection will be described below. As described later, in this embodiment, the microlens 311*i* in FIG. 11 and divided photo-electric conversion units 311*a* and 311*b* pupil-divide a light beam emerging from the imaging optical system. Assume that an image composed by concatenating outputs from the photo-electric conversion units 311*a* in a plurality of pixels 311 in a predetermined range arranged on the same row will be referred to as an AF A image, and an image composed by concatenating outputs from the photo-electric conversion units 311*b* in the same pixels will be referred to as an AF B image. As shown in FIG. 11, it is possible to obtain each of output signals of an AF A image and AF B image from pixels provided with green color filters at a pitch of four pixels. In addition, output signals of an AF A image and AF B image are arranged such that sampling pitches on an object are shifted from each other in the phase difference detection direction by two pixels corresponding to half a pitch.

Detecting the relative image shift amount between the AF A image and the AF B image generated in this manner can detect a focus shift amount in a predetermined area, that is, a defocus amount. This embodiment can obtain an imaging signal from a pixel 311*c* other than pixels which output an AF A image or AF B image and generate an image. When generating an image, the apparatus performs correction processing for imaging signals from the AF pixels 311*a* and 311*b* by using outputs from neighboring pixels. When performing correction, the apparatus may use outputs from AF pixels. A plurality of photo-electric conversion units 311*a* will be referred to as the first pixel group, and a plurality of photo-electric conversion units 311*b* will be referred to as the second pixel group.

Figure 12:
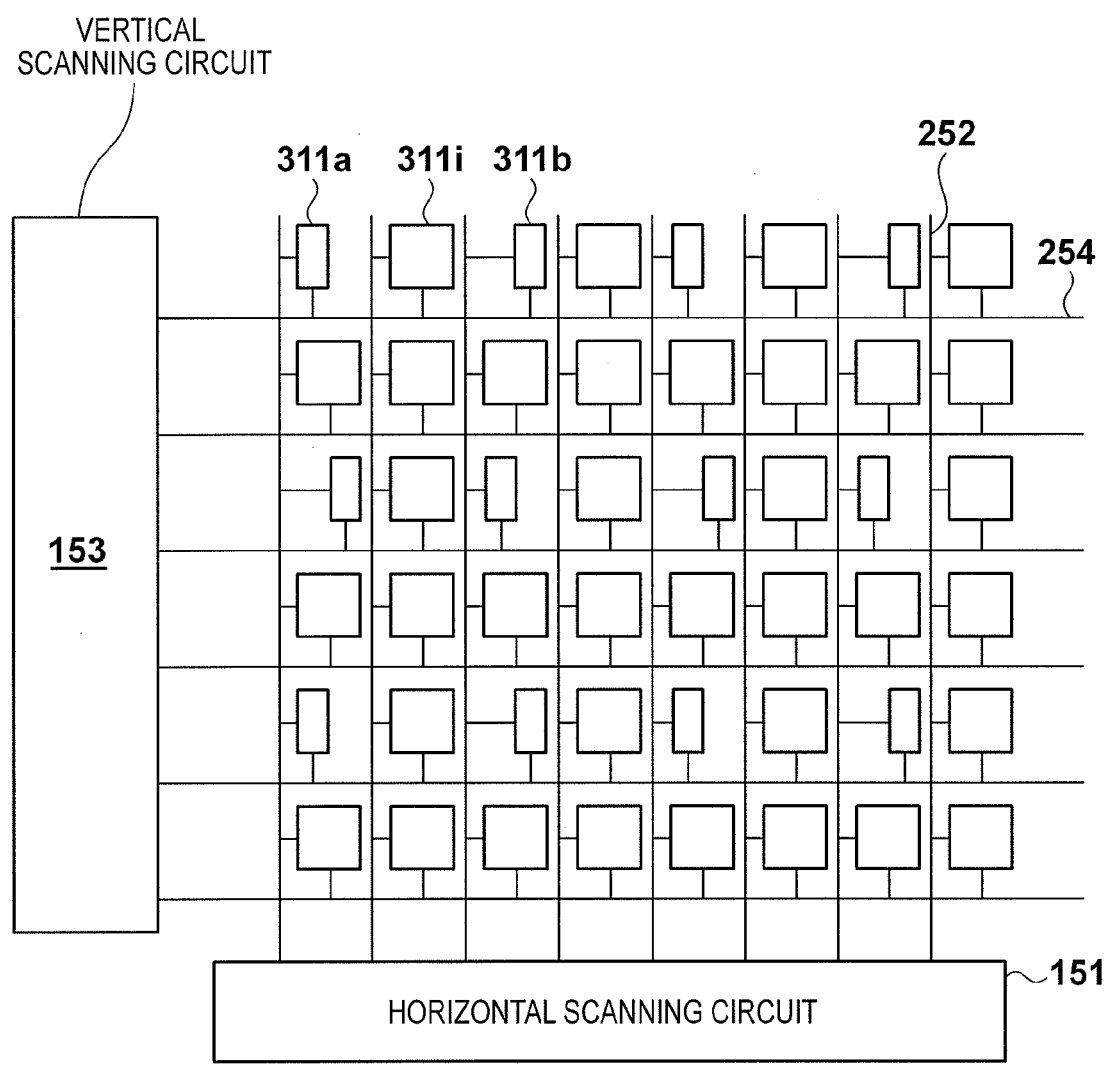
FIG. 12 is a block diagram showing the arrangement of a readout circuit in the image pickup device according to the second embodiment.

FIG. 12 is a view showing the arrangement of a readout circuit in the image pickup device according to this embodiment. Reference numeral 151 denotes a horizontal scanning circuit; and 153, a vertical scanning circuit. Horizontal scanning lines 252 and vertical scanning lines 254 are arranged on the boundary portions between the respective pixels. Signals are read out from the respective photo-electric conversion units to the outside via these scanning lines.

Note that the image pickup device according to this embodiment has two types of readout modes. The first readout mode is called an all-pixel readout mode, which is used to capture a high-resolution still image. In this case, signals are read out from all the pixels.

The second readout mode is called a thinning-out readout mode, which is used to only record a moving image or display a preview image. In this case, since the number of pixels required is smaller than the total number of pixels, the apparatus reads out signals from only pixels remaining after thinning out the pixel groups at a predetermined ratio in both the X and Y directions. When it is necessary to read out signals at high speed, the apparatus also uses the thinning-out readout mode. When thinning out pixels in the X direction, the apparatus increases the S/N ratio by adding signals. When thinning out pixels in the Y direction, the apparatus ignores signal outputs from thinned out rows. When performing addition in the X direction, the apparatus outputs signals from the AF pixels 311*a* and 311*b* upon adding the signals from the pixels 311*a* to each other and adding the signals from the pixels 311*b* to each other or without adding them to each other.

FIGS. 13A, 13B, and 13C are views for explaining the conjugate relationship between the exit pupil plane of the imaging optical system and photo-electric conversion units of the image pickup device which are arranged near a portion corresponding to an image height of 0, that is, the middle of an image plane. The photo-electric conversion units in the image pickup device and the exit pupil plane of the imaging optical system are designed with on-chip microlenses to have a conjugate relationship. In general, the exit pupil of the imaging optical system almost coincides with a plane on which an iris stop for light amount adjustment is placed. On the other hand, the imaging optical system according to this embodiment is a zoom lens having a variable power function. An imaging optical system of some optical type changes in distance from an image plane of the exit pupil or size upon power changing operation. FIGS. 13A to 13C show a state in which the focal length of the imaging optical system corresponds a middle position between the wide-angle end the telephoto end, that is, Middle. Assuming this distance as a standard exit pupil distance Zep, eccentricity parameters are optimally designed in accordance with the shape of an on-chip microlens and an image height (X- and Y-coordinates).

Referring to FIGS. 13A and 13B, reference numeral 101 denotes a first lens group; 101b, a lens barrel member which holds the first lens group; 105, a third lens group; 105b, a lens barrel member which holds the third lens group; 102, a stop; 102a, an aperture plate which defines an aperture diameter at full aperture; and 102b, aperture blades for adjusting the aperture diameter at the time of reducing the aperture. Note that the members 101b, 102a, 102b, and 105b functioning as members for restricting a light beam passing through the imaging optical system are shown in the form of virtual images when observed from an image plane. In addition, the synthetic aperture near the stop 102 is defined as the exit pupil of the lens, and the distance from the image plane is represented by Zep, as described above.

Reference numeral 2110 denotes a pixel for photo-electrically converting an object image. This pixel is placed near the middle of the image plane and will be referred to as a middle pixel in this embodiment. The middle pixel 2110 includes, from the lowermost layer, photo-electric conversion units 3110a (FIG. 13A) or photo-electric conversion units 3110b (FIG. 13B), wiring layers 2110e to 2110g, a color filter 2110h, and an on-chip microlens 2110i. The on-chip microlens 2110i projects the two photo-electric conversion units onto the exit pupil plane of the imaging optical system. In other words, the exit pupil of the imaging optical system is projected on the surfaces of the photo-electric conversion units through the on-chip microlens 2110i.

FIG. 13C shows projection images of the photo-electric conversion units on the exit pupil plane of the imaging optical system. Projection images of the photo-electric conversion units 3110a and 3110b are respectively represented by EP1a and EP1b. In addition, in this embodiment, the image pickup device includes a pixel which enables to obtain an output from one of the two photo-electric conversion units 3110a and 3110b and the sum of outputs from the two photo-electric conversion units. The sum of outputs from the two photo-electric conversion units is the value obtained by photo-electrically converting light beams passing through the two areas of the projection images EP1a and EP1b which correspond to almost the entire pupil area of the imaging optical system. The projection image EP1a is called a first pupil area, and the projection image EP1b is called a second pupil area.

Referring to FIGS. 13A and 13B, letting L be the outermost portion of a light beam passing through the imaging optical system, the light beam L is restricted by the aperture plate 102a, and the imaging optical system generates almost no vignette on the projection images EP1a and EP1b. Referring to FIG. 13C, let TL be the light beam L in FIGS. 13A and 13B. Obviously, since the circle represented by TL includes most parts of the projection images EP1a and EP1b of the photo-electric conversion units, and almost no vignette has occurred. Since the light beam L is restricted by only the aperture plate 102a of the stop, the circle TL can be redefined as the aperture plate 102a. In this case, at the middle of the image plane, the vignette state of each of the projection images EP1a and EP1b is symmetrical with respect to the optical axis, and the photo-electric conversion units 3110a and 3110b receive the same amount of light.

As described with reference to FIGS. 11, 12, and 13, an image pickup device 14 has not only the imaging function but also a function as a focus detection apparatus. In addition, the image pickup device 14 can perform phase difference detection AF as a focus detection method because it includes focus detection pixels which receive light beams that have divided the exit pupil.

Figure 14:
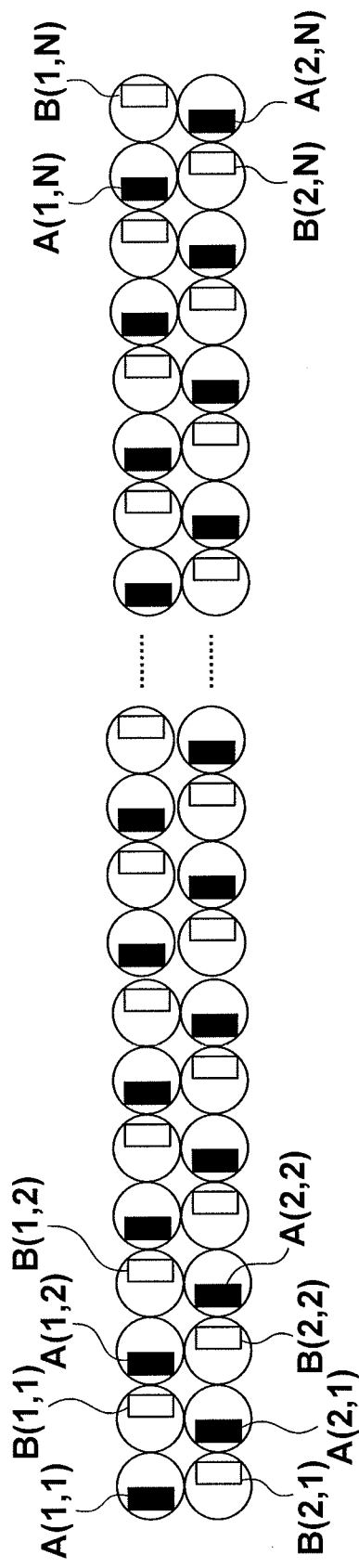
FIG. 14 is a view showing the 2 row×2N column pixels arranged in a focus detection area.

FIG. 14 shows the 2 row×2N column pixels arranged in a focus detection area 401. FIG. 14 shows an array of only outputs extracted from the AF A image pixels 311a and the AF B image pixels 311b arranged discretely as shown in FIG. 11. Let A(i, j) be a pixel to be used for the generation of the jth AF A image signal on the ith row of the image signals formed by only the AF pixels, and B(i, j) be a pixel to be used for the generation of the jth AF B image signal on the ith row. The AF signal shown in FIG. 14 may be the one extracted from signal outputs from all the pixels in the first readout mode described above or may be the one obtained by adding outputs from AF A image pixels to each other and outputs from AF B image pixels to each other in the second readout mode.

As shown in FIG. 11, the AF A image pixels 311a and the AF B image pixels 311b are arranged in different orders depending on the rows on which they are arranged. For example, referring to FIG. 11, the AF A image pixel 311a, the AF B image pixel 311b, the AF A image pixel 311a, . . . are arranged in the order named on the first row, and the AF B image pixel 311b, the AF A image pixel 311a, the AF B image pixel 311b, . . . are arranged in the order named on the third row. For this reason, referring to FIG. 14 as well, the AF A image pixels and the AF B image pixels are arranged in different orders on the first and second rows. Arranging the pixels in this manner can shift sampling positions on an object in the phase difference detection direction, thereby obtaining object information of spatial frequency components having a higher harmonic level than those obtained at a pixel pitch (four pixels in FIG. 11).

The AF signals to be used for focus detection in this embodiment are not subjected to addition processing unlike in the first embodiment, and hence A(i, j) and B(i, j) described above are signal outputs to be used for focus detection processing without any change.

This embodiment is configured to perform phase difference detection by using the A image signal A(i, j) and the B image signal B(i, j) obtained from the A image pixels and the B image pixels alternately arranged on each row. A phase difference detection method using these two pairs of signals is the same as that in the first embodiment, and hence a description of them will omitted. An AF A image signal as the first image signal group constituted by output signals from the first pixel group has two rows of pixel columns in a direction (the vertical direction in FIG. 14) perpendicular to the phase difference detection direction. This indicates that the first pixel group is constituted by pixel columns of a predetermined number of rows equal to or more than two arranged in a direction perpendicular to the pixel column direction. In other words, the predetermined number of rows in this case is two in FIG. 14.

In addition, in the AF A image signal as the first image signal group, sampling positions on the object shift from each other by half the sampling pitch between the first-row signal and the second-row signal in the phase difference detection direction. This indicates that the first image signal group has a difference amount of an integer multiple of the value obtained by dividing a predetermined interval by a predetermined number of rows in the pixel columns direction relative to a sampling position. In other words, in the above case, the predetermined interval corresponds to 2 pixels, and the first image signal group has a difference amount of an integer multiple of 1 pixel (one time, that is, 1 pixel in the above case) obtained by dividing the predetermined interval by 2 (rows) as the predetermined number of rows.

The apparatus performs the processing descried with reference to the flowcharts of FIGS. 7 and 8 in the first embodiment by using the AF A image and AF B image, obtained in the above manner, in the same manner as in the first embodiment. The number of pixels in the first embodiment has been described with reference to pairs of signals from the N−1 pixels. In contrast to this, the second embodiment uses pairs of signals from the N pixels.

This makes it possible, compared to the first embodiment, to always obtain an accurate phase difference detection result with a small error without using any high-cost arrangement regardless of a shift amount (defocus state) at the time of phase detection calculation.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-067128, filed Mar. 27, 2013, and No. 2013-215821 filed Oct. 16, 2013, which are hereby incorporated by reference herein in their entirety.

What is claimed is:

1. An image capturing apparatus comprising:
an image pickup device configured to photo-electrically convert an object image;
a focus detection sensor including a first pixel group in which pixels configured to receive light beams passing through a partial area of a pupil of an imaging optical system which forms an object image are arranged on a predetermined number of rows in a vertical direction and a second pixel group in which pixels configured to receive light beams passing through another partial area different from the partial area are arranged;
a correlation calculation unit configured to perform correlation calculation by using signals from pixels of the first pixel group which are sampled at predetermined intervals in a horizontal direction and signals from pixels of the second pixel group; and
a focus adjustment unit configured to perform a focus adjustment of a phase difference detection method using a result of the correlation calculation,
wherein said correlation calculation unit performs a first correlation calculation by using signals from first sampled pixels of the first pixel group which are sampled at predetermined intervals in a horizontal direction and signals from pixels of the second pixel group and performs a second correlation calculation by sampling second sampled pixels, of the first pixel group, which have a positional shift amount of an integer multiple of a value obtained by dividing the predetermined interval by the predetermined number of rows from the first sampled pixels on a light-receiving surface of said focus detection sensor, and performing correlation calculation by using signals from the second sampled pixels and signals from the pixels of the second pixel group, and
wherein said correlation calculation unit performs a reduction processing for reducing an error which is generated in the first correlation calculation and the second correlation calculation.

2. The apparatus according to claim 1, wherein said focus detection sensor is arranged on an imaging plane of said image pickup device.

3. The apparatus according to claim 1, wherein first pixels constituting the first pixel group and second pixels constituting the second pixel group have the same structure.

4. The apparatus according to claim 1, wherein first pixels constituting the first pixel group and second pixels constituting the second pixel group have different structures.

5. The apparatus according to claim 4, wherein the first pixels and the second pixels are discretely arranged on the imaging plane of said image pickup device.

6. The apparatus according to claim 5, further comprising a third pixel configured to generate an imaging signal.

7. A method of controlling an image capturing apparatus including an image pickup device configured to photo-electrically convert an object image, and a focus detection sensor including a first pixel group in which pixels configured to receive light beams passing through a partial area of a pupil of an imaging optical system which forms an object image are arranged on a predetermined number of rows in a vertical direction and a second pixel group in which pixels configured to receive light beams passing through another partial area different from the partial area are arranged, the method comprising:
a correlation calculation step of performing correlation calculation by using signals from pixels of the first pixel group which are sampled at predetermined intervals in a horizontal direction and signals from pixels of the second pixel group; and
a focus adjustment step of performing a focus adjustment of a phase difference detection method using a result of the correlation calculation,
wherein in the correlation calculation step, a first correlation calculation is performed by using signals from first sampled pixels of the first pixel group which are sampled at predetermined intervals in a horizontal direction and signals from pixels of the second pixel group and a second correlation calculation is performed by sampling second sampled pixels, of the first pixel group, which have a positional shift amount of an integer multiple of a value obtained by dividing the predetermined interval by the predetermined number of rows from the first sampled pixels on a light-receiving surface of the focus detection sensor, and performing a correlation calculation by using signals from the second sampled pixels and signals from the pixels of the second pixel group, and wherein in the correlation calculation step, a reduction processing for reducing an error which is generated in the first correlation calculation and the second correlation calculation is performed.

8. A computer-readable non-transitory storage medium storing a program for causing a computer to execute each step in a control method defined in claim 7.

9. The apparatus according to claim 1, wherein the reduction processing performs an averaging processing to results of the first correlation calculation and the second correlation calculation.

10. The apparatus according to claim 1, wherein the reduction processing selects one of the results of the first correlation calculation and the second correlation calculation which is able to reduce the error.

11. The apparatus according to claim 1, wherein the positional shift amount is an integer multiple of 0.5 times the predetermined interval.

12. The apparatus according to claim 1, wherein said correlation calculation unit performs a third correlation calculation by using signals from first sampled pixels of the first pixel group which are sampled at predetermined intervals in a horizontal direction and signals from a fourth sampled pixels of the second pixel group which are sampled at the predetermined intervals in the horizontal direction and have a positional shift amount of an integer multiple of a value obtained by dividing the predetermined interval by the predetermined number of rows from third pixels of the second pixel group which are sampled at predetermined intervals in a horizontal direction, and performs a fourth correlation calculation by using signals from the second sampled pixels of the first pixel group which are sampled at the predetermined intervals in the horizontal direction and have a positional shift amount of an integer multiple of a value obtained by dividing the predetermined interval by the predetermined number of rows from the first sampled pixels of the first pixel group and signals from the fourth sampled pixels.

13. The apparatus according to claim 12, wherein said correlation calculation unit performs a third correlation calculation by using signals from first sampled pixels of the first pixel group which are sampled at predetermined intervals in a horizontal direction and signals from a fourth sampled pixels of the second pixel group which are sampled at the predetermined intervals in the horizontal direction and have a positional shift amount of an integer multiple of a value obtained by dividing the predetermined interval by the predetermined number of rows from third pixels of the second pixel group which are sampled at predetermined intervals in a horizontal direction, and performs a fourth correlation calculation by using signals from the second sampled pixels of the first pixel group which are sampled at the predetermined intervals in the horizontal direction and have a positional shift amount of an integer multiple of a value obtained by dividing the predetermined interval by the predetermined number of rows from the first sampled pixels of the first pixel group and signals from the fourth sampled pixels, performs a fifth correlation calculation by using the signals from the second sampled pixels and the signals from the third sampled pixels, and performs a sixth correlation calculation by using the signals from the second sampled pixels and the signals from the third sampled pixels.

14. The apparatus according to claim 1, wherein the positional shift amount is smaller than the predetermined interval.

15. The apparatus according to claim 1, wherein the sampling is an addition processing of pixels.

* * * * *